United States Patent [19]
Hansen et al.

[11] Patent Number: 5,956,625
[45] Date of Patent: Sep. 21, 1999

[54] RADIO TELEPHONE

[75] Inventors: Lars Stecher Hansen, Fredeiksberg, Denmark; Jarmo Koponen, Salo, Finland

[73] Assignee: Nokia Mobile Phones, Ltd., Salo, Finland

[21] Appl. No.: 08/800,592

[22] Filed: Feb. 18, 1997

[51] Int. Cl.[6] ..................................................... H04B 1/38
[52] U.S. Cl. ............................ 455/90; 455/550; 455/575
[58] Field of Search .................................. 455/550, 575, 455/90, 343, 347; 379/428, 433

[56] References Cited

U.S. PATENT DOCUMENTS

| | | | |
|---|---|---|---|
| 5,151,946 | 9/1992 | Martensson | 455/90 |
| 5,369,788 | 11/1994 | Nagai | 379/440 |
| 5,461,672 | 10/1995 | Enokido et al. | 379/433 |
| 5,657,370 | 8/1997 | Tsugane et al. | 455/550 |

FOREIGN PATENT DOCUMENTS

| | | |
|---|---|---|
| 2235606 | 3/1991 | United Kingdom . |
| WO 92/09163 | 5/1992 | WIPO . |

*Primary Examiner*—Salvatore Cangialosi
*Attorney, Agent, or Firm*—Perman & Green, LLP

[57] ABSTRACT

A portable telephone with a slidable cover (2), a microphone (10) arranged in the slidable cover (2), and an operating face (5) which may be covered fully or partly by sliding movement of the cover (2). The microphone (10) in the cover (2) is electrically connected to electric parts in a telephone housing (3) via a sliding contact. The sliding contact is constructed as a connector means (20) in the form of slide shoes co-operating with a plurality of conductors (15) which extend in the direction of the sliding movement.

14 Claims, 5 Drawing Sheets

RADIO TELEPHONE

BACKGROUND OF THE INVENTION

The invention concerns a radio telephone or telephone handset with a microphone and an operating face as well as a slidable cover which may cover the operating face at least partly.

In connection with radio or portable telephones it is frequently expedient that the operating face of the telephone can be covered or protected when the telephone is not active.

SUMMARY OF THE INVENTION

The Invention provides a radio telephone with a slidable cover, a microphone arranged in the slidable cover, and an operating face which may be covered fully or partly by sliding movement of the cover, wherein the microphone in the cover is electrically coupled to electric parts in a telephone housing for a range of relative positions of the cover and operating face via coupling means, the coupling means comprising a plurality of conductors extending in the direction of the sliding movement and a contact for electrical coupling with the plurality of conductors at a range of positions along the extent thereof. When the contact comprises a plurality of slide shoes which slide against the respective conductors upon sliding movement of the cover, a good electric connection is ensured. It has been found possible to transfer electric signals almost without noise—even during sliding movement of the cover.

In a preferred embodiment of the invention, the portable telephone is constructed such that the inner side of the cover is provided with a plurality of conductors, which are connected to the microphone, and which extend in the direction of the sliding movement of the cover, the telephone housing being then provided with a contact for cooperation with said conductors. The cover hereby protects the conductors e.g. in the form of conducting paths.

In a preferred embodiment of the invention, the portable telephone is constructed with a curved housing, and in this embodiment the front face of the cover essentially follows the operating face of the housing. When the cover is pulled out to provide access to the operating face, it extends the curvature of the housing at the same time. Advantageously, the cover may be provided with two side walls which extend from the front face along the direction of the sliding movement of the cover. Further, the two side walls and the adjacent portions on the telephone housing may be provided with cooperating rails and guide tracks to impart slidability to the cover. This provides extremely good mechanical control between the housing and the cover of the telephone.

If the telephone is constructed such that, in the preferred embodiment, resilient projections, adapted to cooperate with corresponding notches in the rail portions of the cover, are provided in the guide tracks on the telephone housing, the user sliding the cover will get a clear indication of the position of the cover, as passage of intermediate positions are sensed clearly through variation in the mechanical resistance. In a preferred embodiment, the cooperating projections and notches define an intermediate position of the cover in which a first group of operating pushbuttons are accessible. This group of operating pushbuttons may advantageously be used for answering a call.

Furthermore, in the preferred embodiment, cooperating locking bosses and shoulders counteracting further displacement between the parts are provided in connection with the guide track projections and the rail portion notches in the extreme position of the cover, thereby minimising the risk of unintentional separation of the parts.

In the preferred embodiment of the telephone of the invention, the front plate of the cover has one or more through apertures, through which the sound may pass, in connection with the microphone, said microphone being protected by the cover against wind and weather and mechanical influences.

In a preferred embodiment, the telephone according to the invention is provided with a contact which interrupts or terminates the conversation when the cover is slid to a position in which the operating face is covered.

BRIEF DESCRIPTION OF THE DRAWINGS

The invention will be explained more fully below in connection with a preferred embodiment and with reference to the drawing, in which.

DETAILED DESCRIPTION OF THE INVENTION

Figure 1:
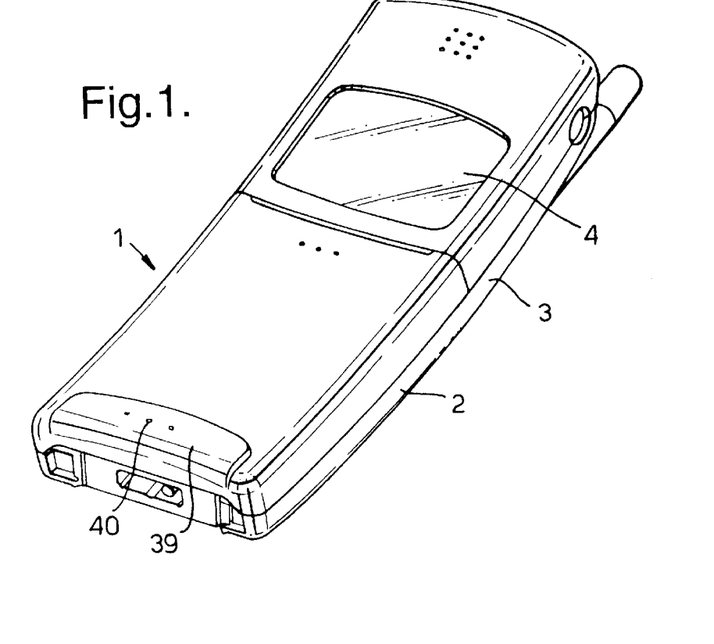
FIG. 1 schematically shows a preferred embodiment of a portable telephone of the invention, with the cover covering the operating face of the telephone.

A preferred embodiment of a portable telephone 1 of the invention is shown in FIG. 1. The telephone 1 has a microphone 10 (see FIG. 4) arranged in a slidable cover 2, and an operating face 5 which may be covered fully or partly by the slidable cover 2. The inner side of the cover 2 is formed with a plurality of metallic conductors 15 (see FIG. 7), which are connected to the microphone 10, and which extend in the direction of the sliding movement of the cover 2. The housing 3 of the telephone 1 is formed with a connector means 20 (see FIG. 6) in the form of slide shoes 21 for cooperation with the conductors 15. The slide shoes 21 may advantageously be resilient.

The housing 3 and the cover 2 of the telephone are of plastics, the materials selected being such as to provide movability between the parts. Further, both parts ideally have a perfect surface finish, and the housing part 3 should be capable of being metallized, e.g. with aluminium owing to EMC. Finally, the parts should have a good mechanical stability. These properties may be obtained by using a polycarbonate (PC) to which polytetrafluoroethylene (PFTE) is added. The selection of materials is to impart a "self-lubricating effect" to the parts, It will be seen from FIGS. 1–3 that the telephone 1 and thereby the housing 3 and the cover 2 are slightly curved. The housing 3 is moreover constructed with a display 4 to display e.g. called numbers, A-numbers, telephone menus, reception conditions and battery status.

The slidability between the housing 3 and the cover 2 is obtained in the preferred embodiment in that the cover 2 (see FIG. 7) has a side wall 16 in each side which terminates in an inwardly directed flange 17 curving slightly about an axis of curvature (not shown), which extends in parallel with the transverse direction of the telephone. Correspondingly, the telephone housing 3 is formed with guide tracks 35 having a corresponding curvature. This means that the displacement between the cover 2 and the housing 3 occurs along a circular arc. This will be seen clearly from FIGS. 1–3, which moreover show that the curvature is relatively slight, since the radius of the circle along which the movement takes place is large with respect to the length of the telephone.

In the position shown in FIG. 1, the cover 2 covers the entire operating face 5 of the telephone. In case of an incoming call, this may be answered by sliding the cover 2 to the position shown in FIG. 2, thereby making a first group of operating pushbuttons 6 accessible. Further, the call may be answered merely. by displacing the cover 2, as will be explained later. In the preferred embodiment, a call may also be answered by means of the volume pushbutton (up or down), which is not shown in the drawing, but is arranged at the side of the telephone.

This first group of operating pushbuttons 6 may comprise a pushbutton for answering a call, a pushbutton for terminating a conversation, and menu control pushbuttons for operating programmed menu facilities of the telephone. Additional displacement of the cover 2 to the position shown in FIG. 3 makes a final group of operating pushbuttons 7 accessible, said group comprising essentially alpha-numerical pushbuttons used for establishing a call or for programming the telephone.

Figure 2:
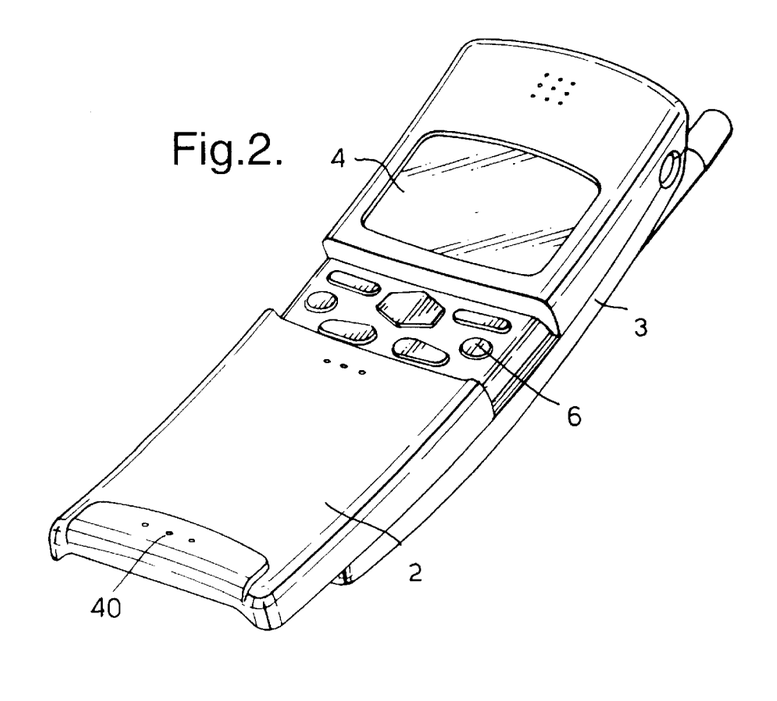
FIG. 2 schematically shows the embodiment of the telephone of the invention shown in FIG. 1, with the cover partly covering the operating face of the telephone, thus making some of the operating pushbuttons accessible.
Figure 3:
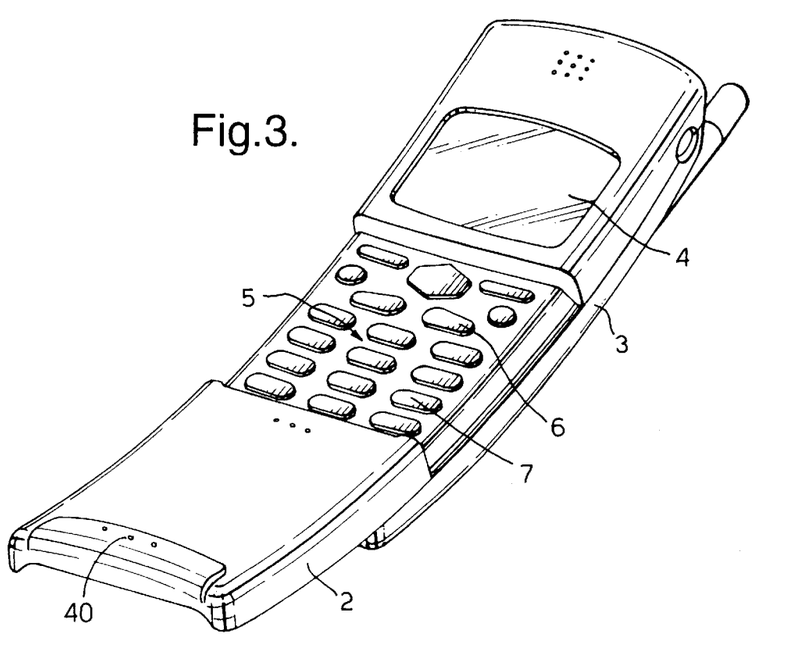
FIG. 3 schematically shows the embodiment of the telephone of the invention shown in FIG. 1, with the cover pulled away from the operating face of the telephone thus making all the operating pushbuttons accessible.

It moreover can be seen from FIGS. 1–3 that the cover 2 has a ridge 39 with one or more apertures 40 through which the sound may pass. The microphone 10 is mounted interiorly In the cover 2 below the ridge 39.

Figure 4:
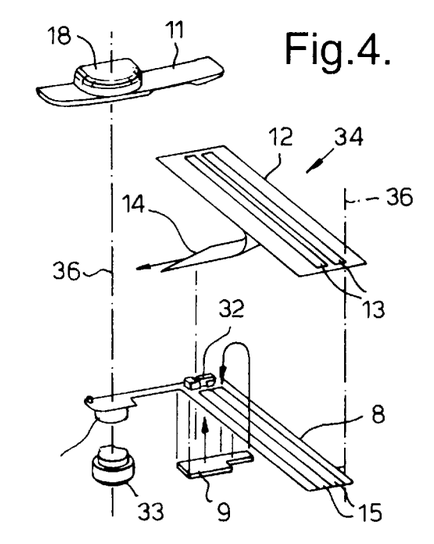
FIG. 4 is an exploded view showing how the microphone and the conducting paths are assembled prior to being mounted in the cover in the preferred embodiment of the telephone of the invention.

FIG. 4 shows how a member 34 with microphone, flexible PCB and contact conductors are assembled before mounting in the cover 2. A flexible print 8 (PCB) has two conducting print paths 15 of a length which approximately corresponds to the length of the cover 2. When mounted in the cover 2, the print 8 extends in the direction of the sliding movement of the telephone. The microphone 10 is attached to the underside of the flexible print 8 and is electrically connected to the two conducting paths 15 via an electric filter 32. A rubber packing 33 is fitted loosely around the microphone 10 to provide mechanical protection, and a foam plastics member 9 is fitted on the rear side of the flexible print 8 to protect the filter 32. The foam plastics member 9 has a flap which flexes about the edge of the print and covers the front side of it. The packing 33 and the foam plastics member 9 thus serve as acoustically suppressing elements.

A plastics sheet 12 (e.g. of polycarbonate) having two longitudinal slots 13 is provided with adhesive on one side covered by a protecting rear side sheet 14. When the rear side sheet 14 is removed, the plastics sheet may be attached (as a laminate) to the flexible print so that the conducting paths 15 are accessible through the slots 13. The width of the plastics sheet 12 is greater than the width of the flexible print 8, so that portions of the sheet 12 with adhesive protrude along the flexible print 8. These protruding portions with adhesive are used in the mounting of the element 34.

Figure 5:
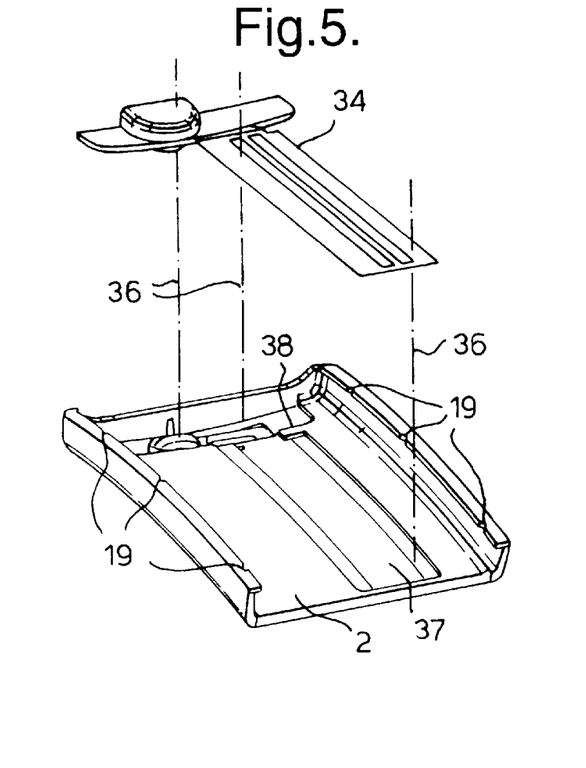
FIG. 5 shows how the pre-assembled microphone/conductor member shown in FIG. 4 is arranged in the cover in the preferred embodiment of the telephone of the invention.

A microphone holder 11 having a microphone housing 18 surrounding the microphone 10 in the microphone gasket 33, is then fitted. The resulting assembly or member 34 is mounted on the inner side of the cover 2, which is formed with a recess 37 to receive the member 34 with microphone. The attachment is achieved in that the member 34 is assembled on some guide pins (not shown, but indicated by the dashed lines 36), whereby the member 34 is received accurately in the recess 37 in the cover 2. The fixation is provided in that the microphone housing 18 with the microphone packing 33 fits in the recess 37, and that the flexible print 8 with the label 12 adheres to the face in the recess 37. When the position is correct, the adhesion is strengthened by ultrasonic welding of the protective label 12 and the microphone holder 11 to the cover 2 in some of the areas where there is direct engagement.

Figure 6:
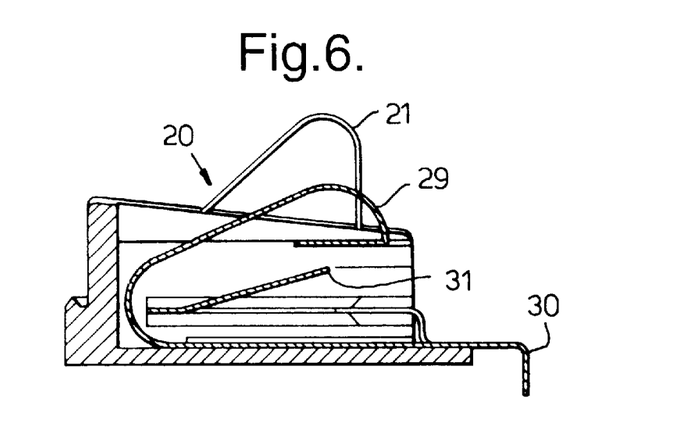
FIG. 6 shows the structure of the connector means of the telephone of the invention.
Figure 7:
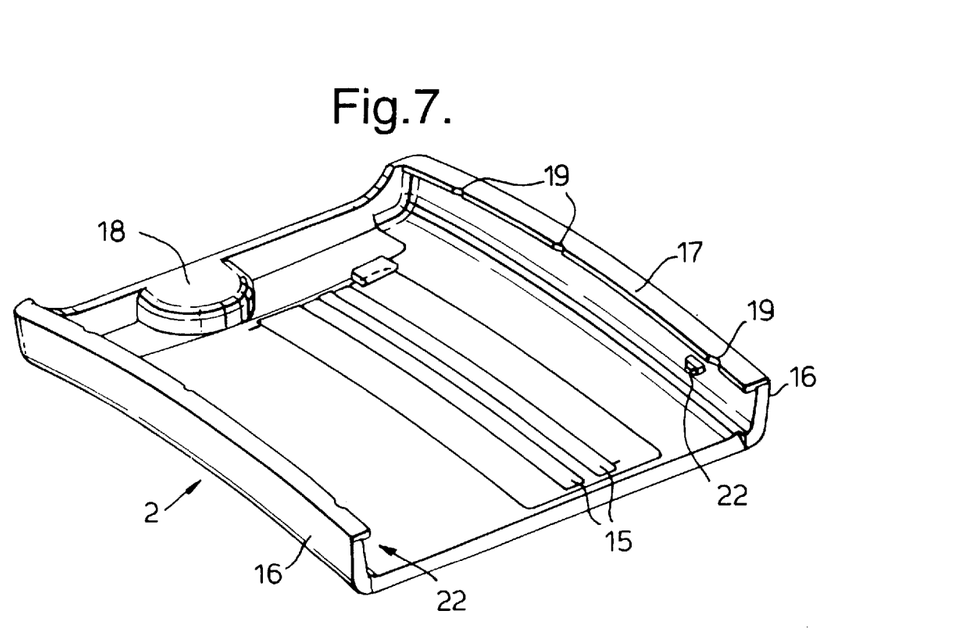
FIG. 7 shows the cover in the preferred embodiment of the telephone of the invention.
Figure 10:
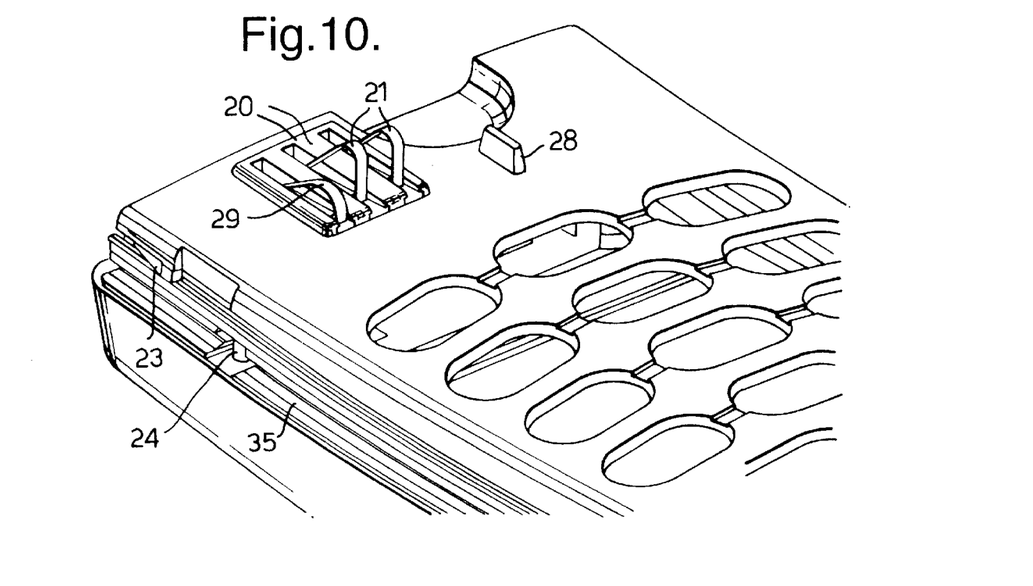
FIG. 10 illustrates the position of the connector means of the telephone of the invention.

The connector means 20 shown in FIG. 6 has the position shown in FIG. 10 in the preferred embodiment of the telephone of the invention. The connector means 20 comprise two slide shoes 21 which, upon displacement of the cover 2, slide against the respective conducting path 15 and ensure a good electric connection in spite of the movement. It has been found that it is possible to transfer electric signals almost without noise—even when the cover 2 is displaced.

The connector means 20 has a microswitch actuator 29 at the side of the slide shoes 21. In the closed position of the cover 2, the microswitch actuator 29 cooperates with an actuation pin 38 on the cover 2, causing the microswitch actuator 29 to be pressed down to engage another contact part 31, thereby closing a current path. It is hereby possible to detect when the cover 2 is in the position shown in FIG. 1, the microswitch being closed here. When the current path in the microswitch is interrupted, a call may be answered without it being necessary to operate other pushbuttons. The conversation is terminated subsequently by closing the current path. The microswitch has two legs 30 which are connected to the PCB of the telephone, while each of the slide shoes 21 has one leg 30.

The slide shoes 21 have resilient properties to compensate for variations in the distance between the cover 2 and the housing 3. The slide shoes and the microswitch actuator 29 are constructed as connector springs and are plated with 20 $\mu$m palladium nickel coated with 2 $\mu$m hard gold. The conducting paths 15 (slide flex) are plated with 5 $\mu$m hard gold. This ensures a wear-resisting and reliable electric connection.

Figure 8:
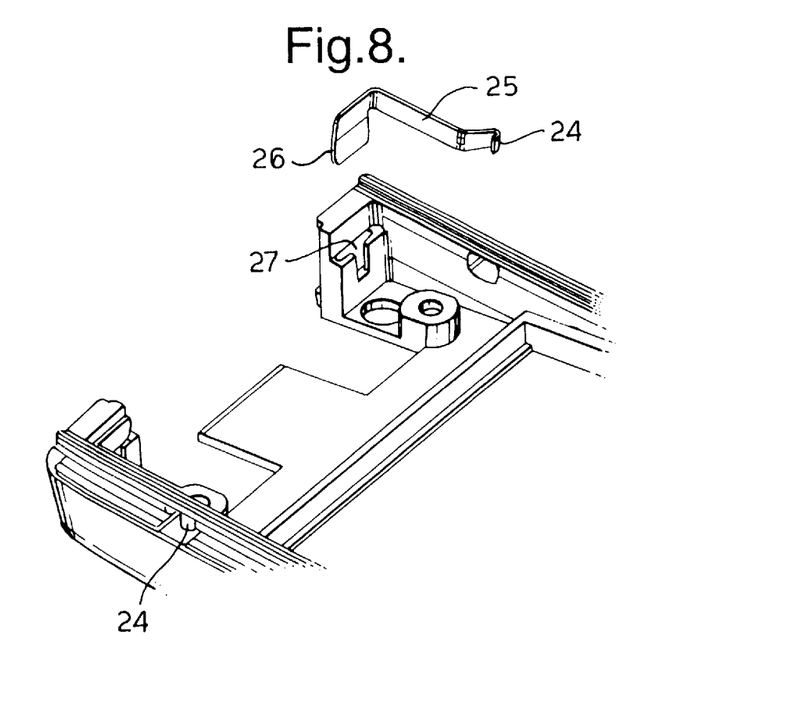
FIG. 8 shows how one of the resilient projections defining the discrete positions of the cover is constructed.

It will be seen from FIG. 8 that the rear part of the housing 3 is provided with a pocket 27 at each side capable of receiving and retaining the respective base parts 26 of resilient members 25 when mounted. The upper part of the housing 3 is removed. Each resilient member 25 has an arm whose end 24 extends out into the guide track 35 through an opening in the housing 3, said member serving as a resilient projection engaged with the notches 19 on the flange 17. The projection 24 and the three notches 19 hereby define the three positions shown in FIGS. 1, 2 and 3. Positions between these three positions can be established, of course, but the three positions may easily be sensed when the cover 2 is displaced. The cooperation between the projection 24 and the three notches 19 is not enough per se to prevent the cover 2 from being pulled out of the housing 3. Therefore, a shoulder or stop 23 is provided in connection with the guide track 35, preventing complete separation of the parts by cooperation with a locking boss on the cover 2.

However, for reasons of safety, the cover 2 is given resilient properties which are sufficient to ensure that twisting of the cover 2 with respect to the telephone housing 3 does not result in elastic deformation of the cover 2 so that its side walls 16 with the rail portions 17 are disengaged from the guide tracks 35 on the telephone housing 3. For this reason, the stops 23 are formed with inclined guide faces permitting the cover 2 with the locking bosses 22 to be easily placed in position again.

The telephone is provided with a timer (not shown) having a delay which delays the answer to a call for a period corresponding to a few seconds when a call is answered by means of the slidable cover 2. This enables the user to interrupt/terminate the call before it is established.

Figure 9:
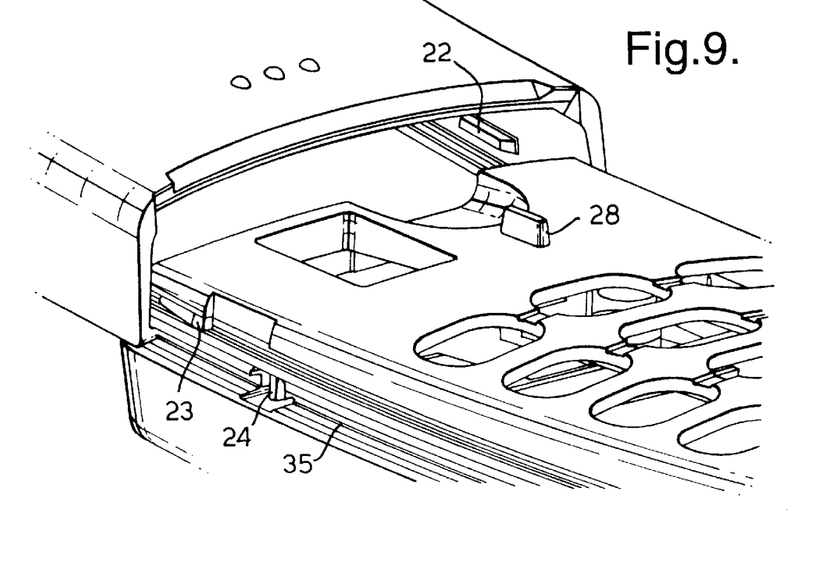
FIG. 9 illustrates the relation between the projections and the corresponding notches.

FIG. 9 shows the cover 2 in a position where it is to be slid inwardly over the stops 23 again. It is noted that the internal parts (pushbuttons, PCB, connector means, etc.) have not been mounted in the telephone housing 3 as yet. A spacer pin 28 supports the cover 2 when this is affected by a pressure on the telephone front face. This avoids separation by compression.

FIG. 10 shows the position of the connector means 20 below the operating face 5. Apart from being without the cover 2, this telephone has not yet been provided with pushbuttons, PCB, etc.

Instead of the continuous flanges 17, the cover 2 may be provided with discrete guide pins which are received in the guide tracks of the housing 3. Alternatively, the guide tracks may be provided on the cover 2.

Some of the figures are provided with auxiliary lines to make the softly rounded shape of the telephone appear more clearly. In the preferred embodiment of the telephone of the invention, the conducting paths are placed on the cover, but the paths might just as well be provided on the telephone housing, with the connector means then mounted internally in the cover. In this case, the paths will be exposed when the cover is removed, which may involve some drawbacks.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A radio telephone comprising a housing having an operating face, and a slideable cover for sliding along at least a part of said operating face and for covering at least a part of said operating face when the slideable cover is in closed position, comprising:
    a microphone arranged in the slideable cover;
    a number of conductors extending in the direction of the sliding movement;
    coupling means for cooperation with said number of conductors in order to connect said microphone to electric parts in a telephone housing;
    said coupling means including a number of sliding legs cooperating with a respective one of said conductors, and
    said sliding legs being formed as resilient metallic conductors biased towards the respective connector in order to ensure the connection between the microphone and the electric parts in a telephone housing for a range of positions of the cover relative to the housing.

2. A radio telephone according to claim 1, wherein the inner side of the cover is provided with said number of conductors, and wherein the telephone housing is provided with a connector means for cooperation with said conductors.

3. A radio telephone according to claim 1, wherein the telephone housing is curved, and wherein a front face of the cover essentially follows the operating face on the telephone housing.

4. A radio telephone according to claim 1, wherein the cover has two side walls extending from the front face in the direction of the sliding movement of the cover, and wherein the two side walls and adjacent portions on the telephone housing are constructed as cooperating rails and guide tracks to impart sidability to the cover.

5. A radio telephone according to claim 4, wherein two slide are provided with rail portions facing each other.

6. A radio telephone according to claim 4, wherein resilient projections are provided in connection with the guide tracks on the telephone housing, said projections being adapted to cooperate with corresponding notches in the rail portions of the cover.

7. A radio telephone according to claim 6, wherein the cooperating projections and notches define an intermediate position of the cover in which a first group of operating pushbuttons are accessible.

8. A radio telephone according to claim 6, wherein cooperating locking bosses and shoulders counteracting further displacement between the parts are provided in connection with the guide track projections and the rail portion notches in the extreme position of the cover.

9. A radio telephone according to claim 8, wherein the cover is given resilient properties sufficient to ensure that twisting of the cover with respect to the telephone housing results in elastic deformation of the cover, so that its side walls with the rail portions are disengaged from the guide tracks on the telephone housing.

10. A radio telephone according to claim 1, wherein the front face of the cover Is provided with one or more through apertures in connection with the microphone.

11. A radio telephone according to claim 1, wherein the telephone is provided with a contact which off hook5 the telephone when the cover is slid to a position in which the operating face is covered.

12. A radio telephone according to claim 1 wherein the sliding contact comprises a connector means in the form of a sliding shoe which cooperates with the plurality of conductors.

13. A cover for covering an operating face of a telephone handset which houses electrical components, the cover covering the operating face fully or partly by sliding movement, wherein a microphone in the cover is arranged for electrical coupling to the electrical components for a range of relative positions of the cover and operating face via coupling means comprising a plurality of conductors extending along the cover in the direction of the sliding movement.

14. A housing for a telephone handset which houses electrical components, said housing including a front cover part having an operating face, and a slideable cover for sliding along at least a part of said front cover part and for covering at least a part of said operating face when the slideable cover is in closed position, comprising a microphone arranged in the slideable cover, a number of conductors extending in the slideable cover in the direction of the sliding movement, an opening in the front cover part adjacent to said operating face, through which a coupling means for cooperation with said number of conductors extends when the handset is assembled in order to connect said microphone to electric parts in a telephone housing.

* * * * *

UNITED STATES PATENT AND TRADEMARK OFFICE
CERTIFICATE OF CORRECTION

PATENT NO. : 5,956,625
DATED : September 21, 1999
INVENTOR(S) : Hansen et al.

It is certified that error appears in the above-identified patent and that said Letters Patent is hereby corrected as shown below:

Column 6, line 27, delete "sidability" and replace with --slidability--.

Column 6, line 28, before "two" insert --the--.

Column 6, line 29, delete "slide" and replace with --side walls--.

Signed and Sealed this

Twentieth Day of June, 2000

Attest:

Attesting Officer

Q. TODD DICKINSON
Director of Patents and Trademarks